(12) United States Patent
Doan et al.

(10) Patent No.: US 6,377,285 B1
(45) Date of Patent: Apr. 23, 2002

(54) ZOOMING SPACE-GRID FOR GRAPHICAL USER INTERFACE

(75) Inventors: Nghi Dong Doan, New York Township; Kenneth Herndon, Suffern Township, both of NY (US)

(73) Assignees: Sony Corporation (JP); Sony Electronics, Park Ridge, NJ (US)

( * ) Notice: Subject to any disclaimer, the term of this patent is extended or adjusted under 35 U.S.C. 154(b) by 0 days.

(21) Appl. No.: 09/240,416

(22) Filed: Jan. 29, 1999

(51) Int. Cl.$^7$ .................................................. G06F 3/00
(52) U.S. Cl. ........................ 345/764; 345/681; 345/619; 345/762
(58) Field of Search ................................ 345/121, 127, 345/333, 339, 433, 334, 435, 418, 439, 438, 660, 666, 667, 672, 674, 681, 682, 619, 629, 630, 762, 765, 764

(56) References Cited

U.S. PATENT DOCUMENTS

| | | | |
|---|---|---|---|
| 5,341,466 A | | 8/1994 | Perlin et al. ................. 345/439 |
| 5,487,143 A | * | 1/1996 | Southgate .................... 345/342 |
| 5,596,346 A | | 1/1997 | Leone et al. ................. 345/127 |
| 5,596,690 A | | 1/1997 | Stone et al. .................. 345/433 |
| 5,615,384 A | | 3/1997 | Allard et al. ................. 345/326 |
| 5,617,114 A | | 4/1997 | Bier et al. .................... 345/113 |
| 5,623,282 A | * | 4/1997 | Graham et al. .............. 345/121 |
| 5,732,230 A | | 3/1998 | Cullen et al. ................ 345/339 |
| 5,883,623 A | * | 3/1999 | Cseri ........................... 345/335 |

OTHER PUBLICATIONS java.sun.com—the source for Java (TM) Technology [online]. Retrieved from the Internet: <www.java.sun.com> on Sep., 12, 2001.

* cited by examiner

*Primary Examiner*—John Cabeca
*Assistant Examiner*—Kieu D. Vu
(74) *Attorney, Agent, or Firm*—Lerner, David, Littenberg, Krumholz & Mentlik, LLP

(57) ABSTRACT

A computer interface is provided for easy organization, arrangement and zooming of logical sets of zooming objects in a zooming graphical user interface. Information is displayed as a zooming universe of graphical objects, including groups of associated member objects, that can be manipulated with interactive input devices. The interface permits a user to associate logically related objects in a space-grid group object, a two dimensional table of cells forming rows and columns on the zooming space. Objects may be positioning in each cell. If such positioning results in an object overlaying the dimensional boundaries of the cell or other zooming objects in the cell, cell dimensions are automatically increased and the positioning of objects in the cell adjusted, allowing a newly added object to be positioned at the user indicated position. Cells with the same row coordinate have the same height dimension. Cell with the same column coordinate have the same width dimension. Adjustment of the dimension of any one cell are translated throughout the entire space-grid structure, resulting in the repositioning of cells and their contents relative to the zooming space, while the positioning among objects contained in a particular cell is preserved.

12 Claims, 8 Drawing Sheets

ZOOMING SPACE-GRID FOR GRAPHICAL USER INTERFACE

CROSS REFERENCE TO RELATED APPLICATIONS

This application is related to the following:

U.S. patent application Ser. No. 09/211,666, entitled Polymorphic Event Handling for Zooming Graphical User Interface, filed Dec. 14, 1998, now U.S. Pat. No. 6,275,232, issued Aug. 14, 2001;

U.S. patent application Ser. No. 09/211,280, entitled Interchangeable Pick Handler for Zooming Graphical User Interface, filed Dec. 14, 1998, now U.S. Pat. No. 6,275,228, issued Aug. 14, 2001;

U.S. patent application Ser. No. 09/211,669, entitled Object Oriented Zooming Graphical User Interface, filed Dec. 14, 1998, now U.S. Pat. No. 6,249,290, issued Jun. 19, 2001;

U.S. patent application Ser. No. 09/223,934, entitled Click-Through Pick Method For Group Objects In A Zooming Graphical User Interface, filed Dec. 31, 1998;

U.S. patent application Ser. No. 09/239,652, entitled System and Method for Providing Zooming Video, filed Jan. 29, 1999;

U.S. patent application Ser. No. 09/240,905, entitled Singleton/Universe Based Zooming Space for Graphical User Interface, filed Jan. 29, 1999;

U.S. patent application Ser. No. 09/245,205, entitled Apparatus and Method for Cropping an Image in Zooming Graphical User Interface, filed Feb. 5, 1999;

All of the above listed patent applications are assigned to Sony Corporation and Sony Electronics, Inc., the assignees herein. All are herein incorporated into this disclosure by reference.

FIELD OF THE INVENTION

This invention relates generally to a graphical user interfaces, more specifically, to zooming graphical interfaces capable of displaying information in multiple levels of magnification to users of computer systems.

BACKGROUND OF THE INVENTION

The available display screen area on a computer monitor has become increasingly inadequate for certain computer applications in terms of the presentation of the complex information and control options typical in advanced computer systems. In this regard, computing systems of the prior art have attempted to provide various solutions to address the problem of limited display screen area.

For example, windowing systems divide a screen into multiple tiled or overlapping display areas, resembling sheets of paper on a desktop, with one window in the foreground and others in the background. These windows remind the user that other information and control options are readily available to be brought to the foreground at the click of a mouse on an unobscured point in the window containing the desired material. However, such systems allow only a limited number of windows to be open and only the foreground window to be operable at any one time. In addition, information within a window that does not fit on the window's display screen area must be scrolled using an input device in order to access chosen information. Since objects that a user wants to access are concealed until explicitly opened and scrolled to, systems of this type deprive the user of 'peripheral' vision of all the available information.

Another attempt to increase displayed information and control options is the use of hierarchical menuing through a sequence of display screens, offered to the user as a cascade of submenu windows or a single designated screen area which is overwritten for each submenu. Both of these display methods have significant drawbacks. Typically, advanced computer systems involve complex hierarchical information structures organized into menus representing decision trees. Attempts to maximize the display screen area by abbreviating menuing options create systems less amenable to use by non-experts, requiring extensive training to produce expert users, because, in many cases, the top levels of a menu do not suggest options at sub-levels. Moreover, the graphical representations of large hierarchical structures often occupy multiple display screens, requiring extensive scrolling to access material not visible on the limited display screen. Further, cascaded windows introduce screen clutter and prevent the user from seeing all of the cascaded information simultaneously, while presentation of information in a single designated screen area removes information from the display each time a write operation occurs. Both methods introduce the possibility for a user to lose track of the current location within the menu hierarchy. As an additional drawback to these methods, diversified data collections not easily described by a well structured hierarchy are represented even less adequately.

A somewhat different method for accessing information available on a computer display is taught by U.S. Pat. No. 5,341,466, to Perlin et al., entitled Fractal Computer User Centerface with Zooming Capability, that patent being incorporated into this disclosure by reference. Perlin discloses a method of altering the size of information on a display, i.e. "zooming", for providing ease of information access to a user. However, the limited capabilities of the zooming functionality in Perlin do not support organization, arrangement and zooming of logical sets of zooming objects in a zooming graphical interface.

Objects, which represent items of information, may be arranged on a plurality of reference surfaces in a zooming space. In most cases, a certain subset of the total objects in the zooming space are logically related. The prior art limits the viewing of logically related objects to zooming of all objects located in the zooming space when a zooming operation is invoked. To enable such prior-art functionality, a user is required to position objects on the zooming space in close proximity with other logically related objects. In this manner, a zoom of all objects in the zooming space enables the user to view the desired subset of objects containing related information. While such an approach may ultimately accomplish the desired task, the process is computationally and time intensive, because all objects in the zooming space must be zoomed in order to view a desired subset of logically related objects.

Furthermore, zooming space organization and editing with current zooming technology presents a host of limitations. The current zooming technology has no capability for automatically adjusting the positioning of logically related objects in the zooming space in response to the positioning of an additional object in the zooming space. When editing a zooming space to provide additional objects logically related to objects previously positioned in the space, the user must position the object to be added in empty space near existing related objects. If the additional object does not fit in the available empty space near existing objects to which it is logically related, the user is forced to chose among one of several undesirable remedies.

If there is limited space between existing objects, the user may position the additional objects in the limited available empty space; alternatively, the additional objects may be positioned on a different reference surface that has available empty space. The former remedy introduces screen clutter, while the later forces the user to alter the desired hierarchical ordering of objects to accommodate the space limitation. The user also could position the additional object away from its related objects, but this approach defeats the desired hierarchical ordering of the objects. Another possible remedy is to manually rearrange the positioning of a series of objects in order maintain the spatial/logical relation of objects and to provide space into which the additional related objects can be positioned satisfactorily. This manual rearrangement is labor intensive, time consuming and ultimately frustrating to the user, forming a serious impediment to effective system use of complex computer systems. These limited capabilities of current zooming interfaces detract from the efficient utilization of computers.

SUMMARY OF THE INVENTION

Accordingly, it is an objective of the invention to provide a zooming graphical interface that provides for easy organization, arrangement and zooming of logical sets of zooming objects in a zooming graphical interface. To that end, a zooming interface is provided that permits a user to associate logically related objects into a group object, allowing easy rearrangement of the positioning of associated objects upon subsequent editing of group objects in the zooming space.

In particular, a computer interface is described that provides a space-grid group object, which enables an organization of logical sets of other zooming objects into a two dimensional table forming rows and columns on the zooming space. The space-grid group object is a two dimensional array comprised of at least one cell, with each cell in the array having height and width dimensions. Each cell in the space-grid group may be defined by the edges of its quadrilateral bounding box and identified by its row and column grid coordinates. The bounding box of each cell of the space-grid is displayed by the interface to facilitate the organization of objects into a readily understandable arrangement of objects. The dimensions of a cell of a space-grid group object, i.e. its bounding box and displayed edges, are automatically resized to enclose the objects associated with a cell.

Logically related objects are positioned in a cell of a space-grid group object with a desired spatial relationship relative to other zooming objects in the cell. The user may interact with a displayed space-grid and may modify the space-grid by adding an object to a cell of the space-grid. The added object is automatically associated with all other objects positioned in the cell. The zooming graphical user interface of the invention automatically increases the dimensions of the edited cell so as to circumscribe the objects positioned in the cell, allowing the positioning of the newly added object at a user-selected position in the edited cell. A change in cell dimensions of a single cell causes corresponding dimensional changes in the entire space-grid structure, resizing and repositioning, as necessary, each cell of the space grid. The height of each cell with the same row coordinate as the edited cell and width of each cell with the same column coordinate as the edited cell are automatically resized to the dimension of the edited cell. The positioning of all other cells in the space-grid is adjusted relative to the zooming space to allow for the changed cell dimensions, while the positioning among objects contained in a particular cell is preserved. In other words, the spatial relationships of objects within individual cells are preserved, while the dimensions and location of cells of the space-grid group object are altered relative to the zooming space. This functionality allows the user to quickly edit and adjust the zooming space to add objects logically related to previously positioned objects.

The zooming graphical user interface of the present invention will find utility in object oriented drawing applications and other zooming applications that use groups to logically organize graphical data which is displayed as a zooming universe of graphical objects. The graphical objects, including collections of logically related objects associated into groups, can be manipulated with interactive input devices. The zooming graphical user interface permits a user to easily organize and re/arrange logical sets of zooming objects in a zooming space and allows the display of the zooming objects at altered levels of magnification.

BRIEF DESCRIPTION OF THE DRAWINGS

A better understanding of the present invention, and additional objects, features and advantages of the invention, will be apparent to those skilled in the art upon reference to the following detailed description in conjunction with the accompanying drawings, in which.

DETAILED DESCRIPTION

Figure 1:
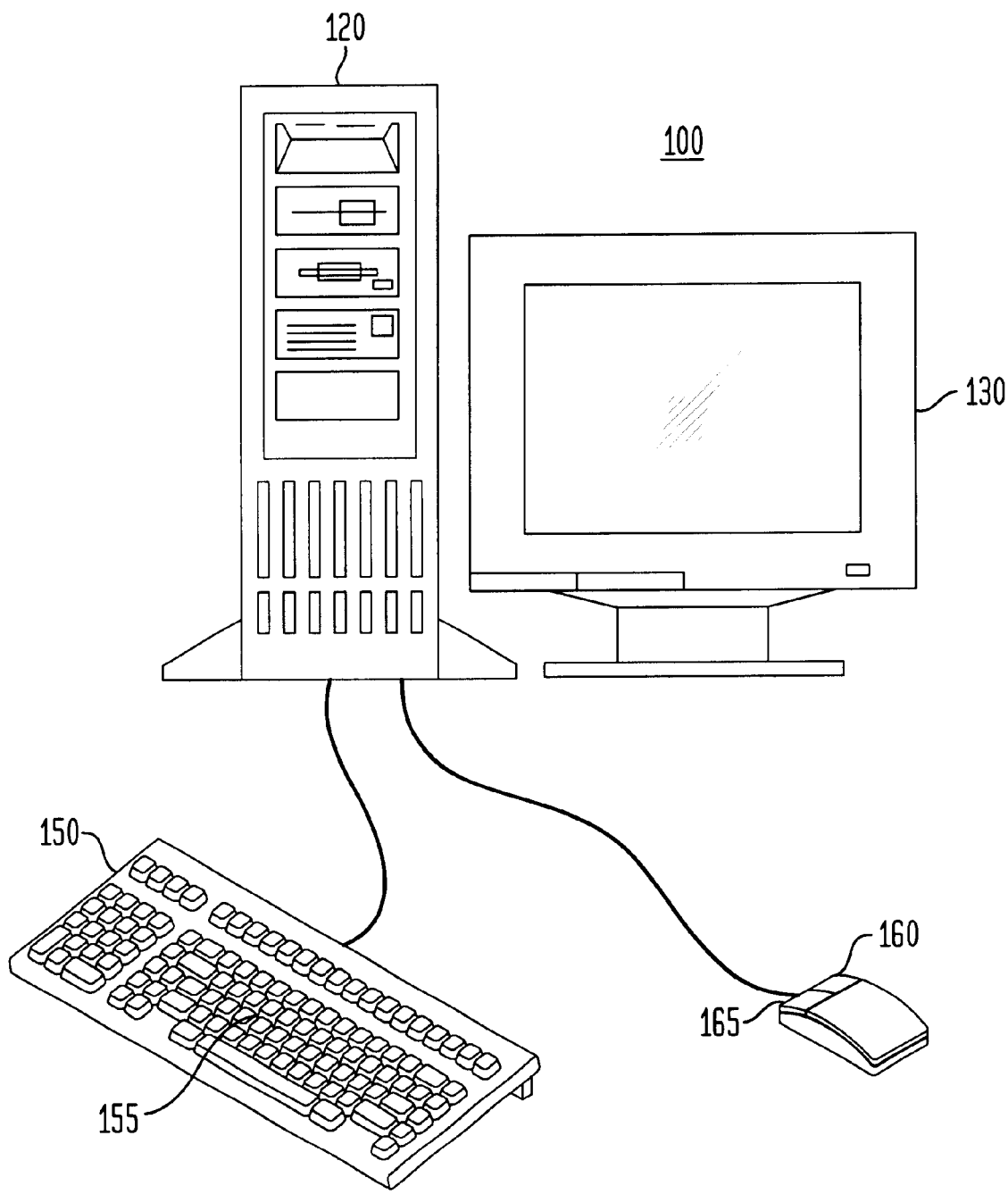
FIG. 1 is a schematic diagram illustrating a conventional computer system.

A zooming graphical user interface according to the present invention provides for organization, arrangement and zooming of logical sets of zooming objects in a zooming graphical interface. A space-grid group object may be positioned within a zooming space and logically related objects associated therewith by being positioned within a cell of a space-grid object. The zooming graphical user interface constructs graphic representations of zooming objects from stored information, which representations the user is able to modify by interacting with the objects displayed in a zooming space on a display screen. The user may interact with a displayed zooming space and can modify the space by altering the displayed zooming space. The user may rearrange the positioning of objects and add objects to those displayed in a space-grid cell on a display screen, which alteration will result in corresponding modification of the dimensions and location of cells of the space-grid and their associated memories.

Responsive to the positioning an object in the space-grid cell, the zooming graphical user interface of the present invention adjusts the dimensions of the cell so that all objects associated with the cell are circumscribed by the space-grid cell. This operation creates additional space within the space-grid cell that the so-positioned object occupies. The dimensions of cells with corresponding row and column coordinates also are adjusted causing a repositioning of the other cells of the space-grid group object relative to the zooming surface. Notwithstanding the repositioning of a cell, the positioning of objects relative to each other within an individual cell is preserved.

In a preferred embodiment, the instructions implementing the zooming graphical user interface of the invention are coded in Java®. Of course, other embodiments may be implemented using any platform independent language, such as PERL™, or any platform dependent language, such as C++ or Fortran.

The following provides non-limiting illustrations of the system architecture of and display screen views for the present invention. It is understood that other screen view layouts and user interfaces are similarly suitable for use in the present invention. In the description below, like reference numerals are used to describe the same, similar or corresponding parts in each figure.

Computer Architecture

FIG. 1 illustrates an exemplary computer system 100 which is adaptable for implementing the zooming graphical interface system according to the invention. The computer system 100 includes a main housing 120 connected to a monitor 130 and interactive input devices, in this example a keyboard 150 and mouse 160, which include switches 155 and 165 having positive on and positive off positions for generating signals to the system 100. The main housing 120 includes various items (not shown in FIG. 1) that are typically used in a computer system 100. By way of example, these elements may be a processor, ROM and RAM memory, cache memory, a hard disk storage device, a floppy disk drive, a storage tape drive, graphics and audio cards, a network interface card, and a power supply, all interconnected using a conventional architecture.

A computer system 100 configured as such provides visual output through a monitor 130 and audio output through speakers (not shown), and receives input through a keyboard 150, mouse 160, and possibly a microphone (not shown). The user can interface with the computer system 100 in conventional fashion, such as by positioning the screen cursor on a desired object using an interactive input device, such as mouse 160, and clicking (depressing a button of) the interactive input device, such action providing input to the system and identifying/selecting the desired object for further activity. For example, the user may use the mouse 160 to move a cursor about a graphical display and position the cursor over an icon for an application on the graphical display shown on the monitor 130. The user may then provide input to the system using the mouse 160 by a double click of a mouse switch 165 while the cursor is on the icon, such action typically operating to launch the application represented by the icon (i.e., cause it to be executed). The display and functionality may be referred to as a graphical user interface.

Although the illustrated computer system 100 is of the desktop type, it is noted that the present invention is equally applicable to other computer system types, such as the lap-top type and palm type. Additionally, although the preferred embodiment implements a mouse for moving a cursor and providing input, it is noted that various technologies for accepting input and displaying output will evolve, and that such evolving technologies are contemplated by the present invention. For example, instead of mouse and keyboard commands, audio commands may ultimately be used to update the display. These and other alternatives will be recognized by the ordinarily skilled artisan.

Figure 2:
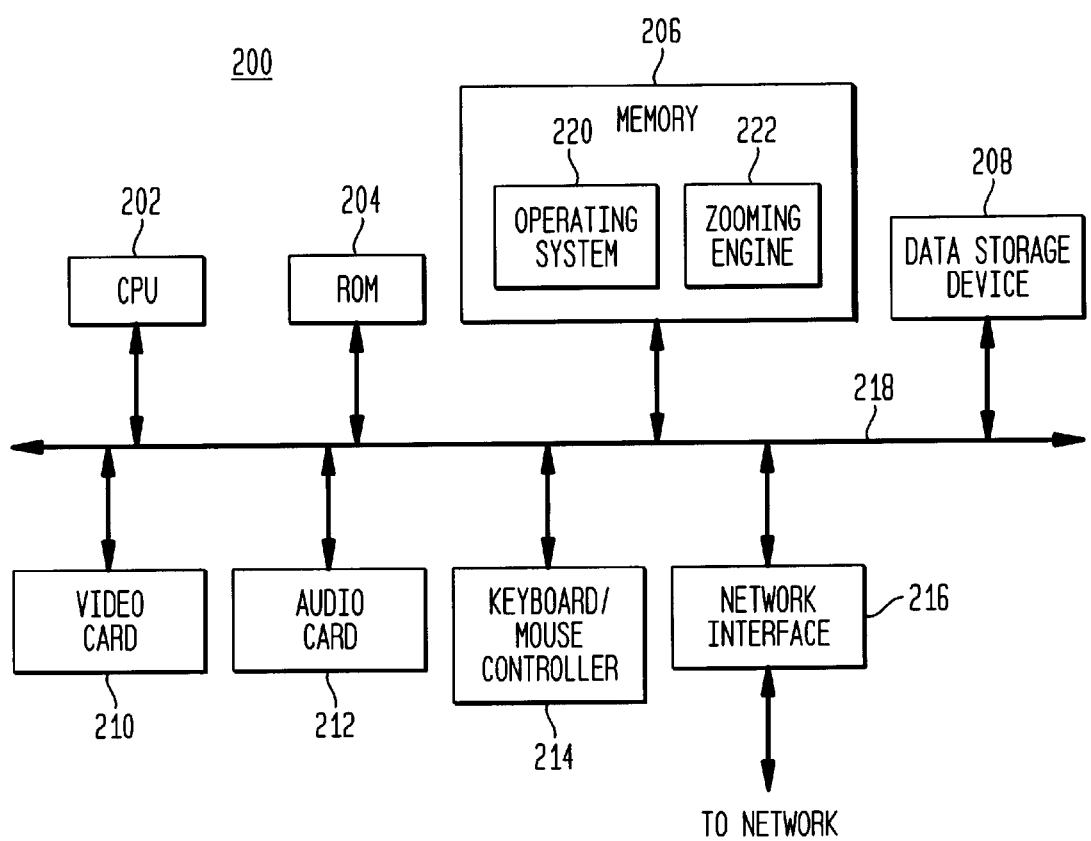
FIG. 2 is a block diagram illustrating a computer system having an embodiment of a zooming engine in accordance with the present invention.

The block diagram of FIG. 2 illustrates an embodiment of a computer 200 (the portion of the system 100 typically found in the main housing 120) that includes a CPU 202, ROM 204, memory 206, data storage device 208, video card 210, audio card 212, keyboard/mouse controller 214, and network interface 216, each coupled to a bus 218 in conventional fashion. The CPU 202 is a conventional processor, such as the PENTIUM™ type provided by Intel Corporation of Santa Clara, Calif. The CPU 202 executes instructions, such as those provided in ROM 204 and/or memory 206. ROM 204 is a read only memory, which retains its stored information even while it is disconnected from a power supply. The ROM 204 may, for example, store instructions for a boot up sequence. Memory 206 is preferably volatile memory for storing instructions and information used during ordinary operation, such as those provided in the computer operating system. The data storage device 208 provides long term data storage, and is preferably a magnetic or magneto-optic hard disk device. The video card 210 and audio card 212 respectively provide the interface between the computer 200 and the monitor and speakers. The keyboard mouse controller 214 interfaces the computer 200 and the keyboard and mouse that are used to provide input to the computer 200. The network interface 216 is a conventional network interface card that interfaces a local network line and the computer 200. The network interface card may be a conventional ethernet card, or may be a multipurpose interface for communication over a ethernet, ISDN and/or other networks. Access to the Internet can be provided through the network interface 216.

It is noted that a computer 200 may include different items than those of the described embodiment. For example, I/O ports for interfacing with printers and plotters, a floppy disk drive, a CD ROM drive, and various other features may be included, and various elements may be excluded. Also, although Internet access is described in connection with a network interface card, a modem connected to a conventional phone line can be used to access the Internet, such as through an internet service provider. The ordinarily skilled artisan will recognize the various alternatives for the computer 200.

Still referring to FIG. 2, the memory 206 also will include an operating system 220 and a zooming engine 222. The operating system 220 is a program that is typically loaded from the long term data storage device 208 (e.g., hard disk) to the main memory 206 during a boot up sequence. The operating system 220 manages the other programs in the computer, which are referred to as applications, and includes particular instructions and operations that can be used by the applications, either directly or through an application program interface. The operating system 220 also handles exchanges to and from devices connected to the computer (e.g., printers, disk drives, etc.), manages memory use, and allocates computing resources in multitasking environments.

The zooming engine 222, which will be described with more particularity below, includes instructions for updating the display 130 according to user and system input, including the zooming functionalities described in connection with the present invention. For example, the zooming engine 222 manages the various zooming objects that may be provided in a zooming space, determines the available display space, determines which zooming objects are visible in the available view space, and responds to various events to update the display, such as mouse and keyboard events which arise in response to the user's navigation of the zooming space. Preferably, the zooming engine 222 is provided as software, although all or part of the zooming engine 222 may be provided as hardware, firmware, or a combination of software, hardware and firmware.

In the preferred embodiment, the system 100 utilizes a known computer operating system, such as UNIX®, WINDOWS95® or WINDOWS98®, found resident in area 220 of memory 206. When implemented as a set of instructions for a computer processor, the method of the invention is written in the Java® programming language, and the instructions, including the Java® virtual machine, can be found resident in area 220 in the memory 206 of the system 100. The Java® virtual machine, an abstract specification for a computing device, operates as an interface between the Java® application and the specific computer platform (e.g. Intel, Apple) on which the application is to be run. As is known in the art, Java® is a platform independent, object oriented programming language.

Alternatively, the system may include hardware and software operable to permit communication with the World Wide Web or with a local network. In that case, the software would include a Java® enabled browser, such as Netscape Navigator™. This enables the system 100 to run the instruction set received through the network interface 216 from a web site where the platform independent language instruction set resides.

Zooming Engine

Figure 3:
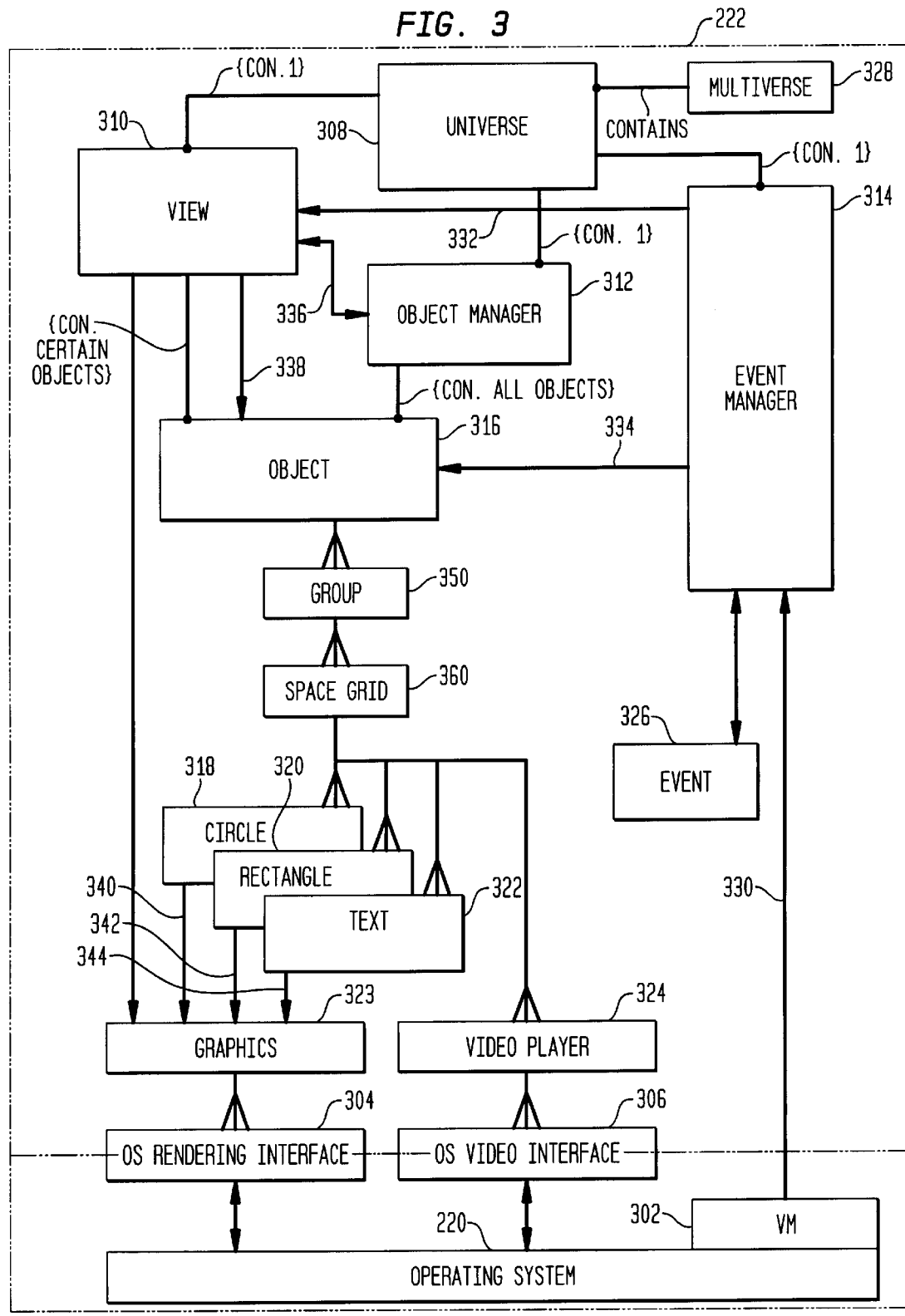
FIG. 3 is a block diagram illustrating an embodiment of a zooming engine in accordance with the present invention.

The block diagram of FIG. 3 illustrates an embodiment of a zooming engine 222 architecture for facilitating zooming graphical user interface functionalities such as those contemplated by the method of the invention. Preferably, the zooming engine 222 operates with an operating system 220, as described above, and includes various instructions which are executed by a CPU for providing the zooming graphical user interface functionality.

Additionally, although the zooming engine 222 may operate in any environment which facilitates the execution of instructions, including platform dependent ones, the preferred zooming engine 222 embodiment is generally platform independent, running on a virtual machine 302. The preferred zooming engine 222 embodiment is implemented in the Java® programming language and the virtual machine (VM) 302 is a Java® VM. Interfaces 304, 306 between the zooming engine 222 and operating system 220 may also be provided, such as those for rendering graphics 304 and video 306 using the operating system 220. These interfaces 304, 306 may comprise conventional facilities for interfacing with the operating system 220 such as dynamic link library (DLL) files, and/or the Microsoft DirectDraw and DirectShow SDK for the WINDOWS environment.

The zooming engine 222 includes a universe module 308 which is the highest level module corresponding to a given zooming space. The universe module 308 contains a view module 310, an object manager module 312, and an event manager module 314. These modules 308–314 include instructions which, when executed, perform the various functions described in connection with them. Although the modules 308–314 (as well as the additional submodules directly or indirectly associated with them) will likely be provided as software, their functionality may also be produced by using hardware or firmware. Preferably, the modules 308–314 are implemented using Java® singleton class definitions which allow for only one instance of a class to be created.

The illustrated universe module 308 and all of its submodules pertain to a single zooming space. Multiple instances of zooming spaces may be provided, as the multiverse 328 may contain numerous zooming spaces which would each comprise its own universe module 308 and appropriate submodules. Such a multiverse facility is described further in the above referenced application having Ser. No. 09/240,905, entitled Singleton/Universe Based Zooming Space for Graphical User Interface.

Referring again to the object manager module 312, that module controls all of the objects in the zooming space, which zooming objects are defined by the zooming object module 316, including its subclass, group module 350. The group module is further defined by its sub-class, the space-grid module 360, and subclasses thereof, such as circle module 318, rectangle module 320, text module 322, and video player module 324. The branches, such as those shown between the zooming object module 316, the group subclass 350, the space-grid subclass 360 and the further subclasses 318–324, indicate that multiple instances of each subclass may be instantiated. For example, there may be more than one circle object, with each circle object inheriting the characteristics of the superclass zooming object module 316, as well as from group module 350, space-grid module 360, and circle module 318. Additionally, there may be other relationships which need not be shown for an understanding of the invention. For example, the zooming object module 316 could have a quadrilateral module as a subclass, which in turn could have square module and rectangle module subclasses.

The zooming engine 222 may interface with various operating systems 220. Where this is the case, the graphics module 323 interfaces the zooming engine 222 to the appropriate OS rendering interface 304. Similarly, there may be various different video player modules 324, which in turn may be ported to various operating system 220 interfaces. Alternatively, the zooming engine 222 may operate as a more pure Java® embodiment which does not require specific rendering and video interfaces in order to operate with a particular operating system 220.

The event manager module 314 produces event objects 326 responsive to system events (arrow 330) such as mouse and keyboard events initiated by the user. The event objects 326 are then passed, along with event handling information, to the view module 310 (arrow 332) and/or the zooming object module 316 (arrow 334) so that the display can be appropriately updated.

The view module 310 contains at least one set of zooming objects selected from those in the zooming space, through request and receipt (arrow 336) of information about the zooming objects from the object manager 312. Typically, the view module 310 contains those zooming objects which reside in the main zooming view. They may be associated to the same index used by the object manager 312. This allows the various objects in a view to be separately organized in the view module 310, so that separate calls to the zooming object module 316 are not required. For example, the view module 310 can issue commands (arrow 338) which are propagated through the object module 316 and any relevant subclass modules to affect rendering of many zooming objects contained in the main zooming view.

Individual or groups of zooming objects may be separately targeted for update responsive to event information passed directly to the zooming object module 316 by the event manager 314, and rendering commands would be more directly issued by the objects, such as is depicted by arrows 340–344. An example of such an update could be responsive to user selection and manipulation of a single object.

Zooming Space

Figure 4:
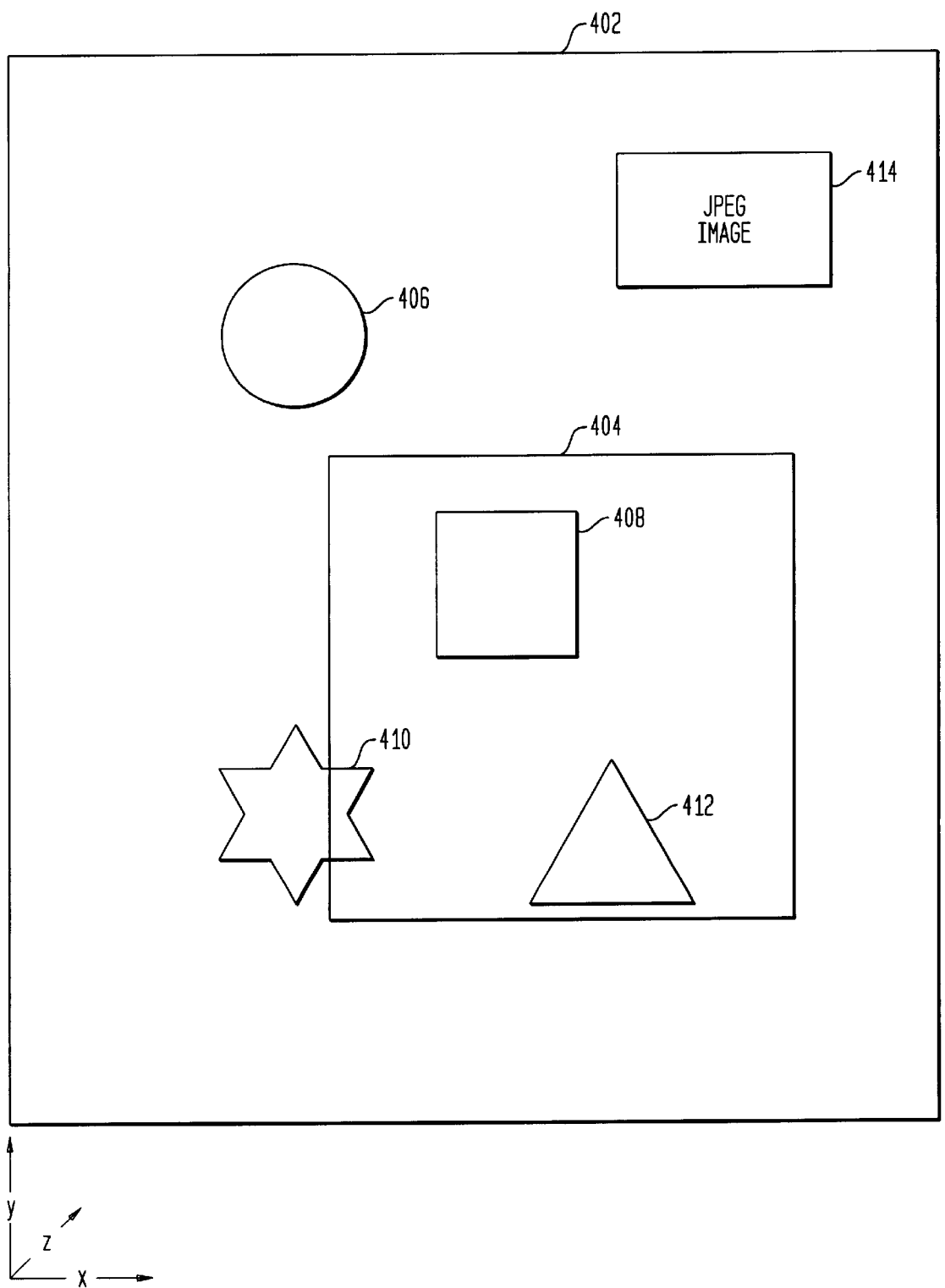
FIG. 4 is a schematic diagram illustrating various zooming display objects in a zooming space in accordance with the interface of the present invention.

FIG. 4 is a schematic diagram illustrating various geometric objects representing information contained in a zooming space 402, including zooming objects 406, 408, 410, 412, and 414. The outer boundaries of the figure, 402, represent the zooming space. While the edges of the zooming space 402 are shown for ease of illustration, they may not necessarily be part of the zooming space. Included in the zooming space 402 is an available view space 404. Typically, the available view space 404 is dictated by the display device 130 and its configuration. Thus, the available view space 404 may be the maximum display area for the display device 130. Additionally, in an environment where the zooming engine 222 works in conjunction with an operating system 220, the available view space may be related to features provided by the operating system 220. For example, the usable display area for an open window in a WINDOWS operating system 220 may be the available view space 404. Thus, the available view space 404 can change by using conventional controls for maximizing the window, or altering the locations of the sides of the window.

Objects available for zooming in zooming space 402 include a circle 406, square 408, star 410, and a triangle 412, such objects being graphical objects having particular sizes, shapes and colors. The zooming space also may include other types of zooming objects, such as complex still images, video images, or any other type of object which may be displayed within the zooming space. Image objects may be photographs provided in conventional formats such as without limitation, JPEG, GIF, BMP, FlashPix, and others. Video objects may comprise standard video such as AVI, Quicktime, MPEG, and others. For example, the zooming space 402 includes a JPEG image 414. Objects also may comprise input tables and forms. The above listed zooming objects and object formats are for illustrative purposes and are by no means exhaustive. The ordinarily skilled artisan will recognize the various alternatives objects and object formats that can be readily substituted for those listed.

The zooming space 402 includes all of the zooming objects 406–414 that may be viewed by the user during navigation of the zooming space 402. However, all of the zooming objects 406–414 might not be visible at a given time, since the available view space 404 may not be large enough to encompass the entire zooming space 402. For example, here the available view space 404 covers the square 408, a portion of the star 410, and the triangle 412.

In FIG. 4, all of the objects displayed on the available view space 404 are "zoomed out" so that the displayed objects appear small. In this state, the user can easily perceive the general arrangement of information and distinguish different types of data, such as pages of text or tables of numerals. For convenience of illustration, the square 408 and the triangle 412 of FIG. 4 have been assigned as member objects of the same group, located on a first reference surface in the foreground of the display. The circle 406, star 410, and JPEG image 414 are not members of the group but are located on same reference surface. Additional objects may be added to the zooming space and be located on this first reference surface or on a second reference surface, behind the other zooming objects 406–414. In the former case, the added zooming objects would appear the same size as the zooming objects located on the first reference surface. In the later case, the added zooming objects would appear smaller in size as compared to the zooming objects 406–414 currently located on the zooming space 402, such smaller size being indicative that the objects is located behind the first reference surface on a second reference surface.

The user can navigate the zooming space 402 in three dimensions. Generally, movement in the X and Y directions, corresponding to the planar surface of the display device available view space an be referred to as panning, while navigation in the Z direction can be referred to as "zooming". Navigation in the Z direction (into or out of the display screen) causes the perspective of the available view space 404 to appear to zoom into or away from the zooming objects in the zooming space 402.

Navigation into the display screen (the +z direction) causes the zooming objects to appear to become closer to the viewer, and thus larger. This may be referred to as "zooming in." This also causes the perceived separation of the zooming objects to increase, which may cause a zooming object to leave the available view space 404. To "zoom in", the user marks information desired for viewing in greater detail with a cursor and operates the input device in a manner to cause the desired information to be magnified.

Navigation out of the display screen (the −z direction) causes the zooming objects to appear to become further away from the user, and thus smaller. This may be referred to as "zooming out." Of course, as the user zooms out, the perceived separation of the zooming objects decreases as well, and additional zooming objects may come into the available zooming space 404. To "zoom out", the user marks information desired for viewing in lesser detail with a cursor and the desired information is reduced in size, thereby displaying a larger portion of the chosen information. All zooming operations can be responsive to conventional interactive input commands. For example, depressing the left mouse key can cause a zoom in, and depressing the same button with the keyboard shift key depressed can cause a zoom out.

Group Zooming

The zooming graphical user interface of the invention allows individual objects or groups of objects to be manipulated, such objects being selected from the zooming objects 406–414 in the zooming space 402. This methodology may be implemented as a feature of the zooming engine. In the zooming universe, users are able to interact directly with graphical objects by selecting an object with a mouse. This action produces an event in the zooming engine, initiating an intersection test on each visible object in the universe. Primitive objects, such as lines, rectangles or ellipses, perform a simple mathematical test to check if the point under the mouse cursor intersects the object's geometry. If an object, as defined by its bounding box, is intersected by the point under the mouse cursor, the user is able to perform additional operations on the intersected object. Since the zooming object class has no geometry of its own, a variety of shaped bounding boxes can be chosen to determine whether an intersection between the bounding box and a point under the mouse cursor has occurred, although the preferred bounding box is a rectangle.

Zooming objects may be associated into a group object (i.e., a plurality of associated member objects on the same reference surface), defined by a composite bounding box circumscribing all member objects in the group. At certain times, it may be preferable to manipulate a particular subset of the objects in the zooming space in response to a user request, enabling the user to operate on a particular subset of related objects with a single command. Such a selective manipulation functionality is described further in the above referenced application having Ser. No. 09/223,934, entitled Click-Through Pick Method For Group Objects In A Zooming Graphical User Interface.

Various methods of implementation to achieve a group assignment will be apparent to those skilled in the art.

However, for a preferred embodiment of the invention, such group assignment will be selectable by a user and may be arranged by selection in a menu or tool bar displayed (or displayable) on the display screen of the user's terminal. Subsequent additions of objects to the zooming space may be associated with a previously defined or a new group according to the method of the invention.

Figure 5:
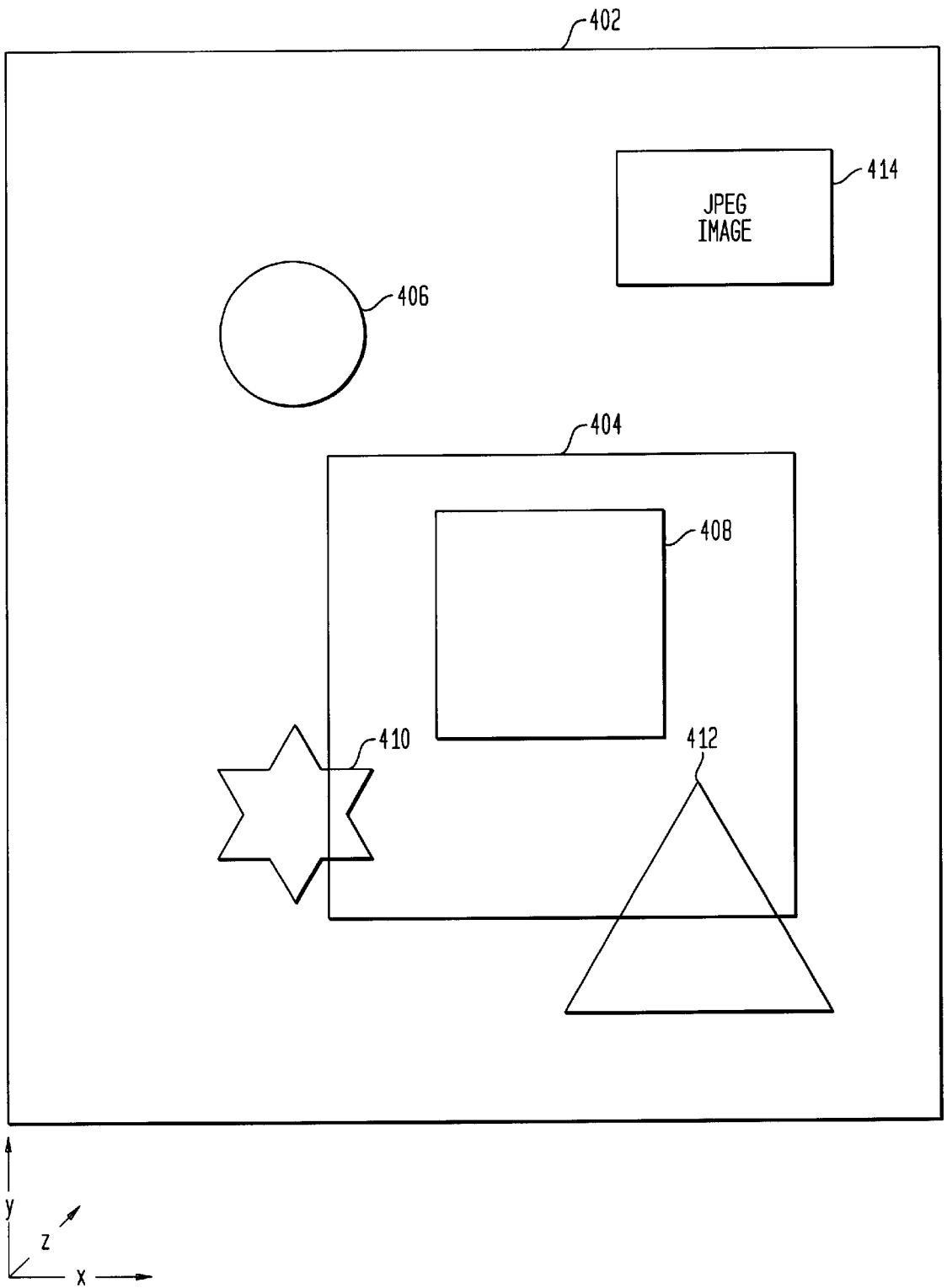
FIG. 5 is a schematic diagram illustrating the group object of FIG. 4 "zoomed in"

FIG. 5 illustrates the composite group object "zoomed in" relative to the configuration of FIG. 4, and shows all of the objects in the zooming universe associated with the same group enlarged. The objects associated with the group object are displayed at a larger size. As seen in FIG. 5, the square 408 appears larger and remains visible in the available view space 404. The triangle 412 also appears larger but has partially diverged out of the available view space 404 and must be panned to for viewing. The star 410 remains the same size and must be panned to for viewing, since it remains partially located outside the available view space 404. The other objects not in the available view space, the circle 406 and the JPEG image 414, also remain the same size but must be panned to for viewing. In this figure, the group object has been selected for "zooming in" and all the members of the group have been magnified.

While the figures depict an operation of "zooming in," it will be understood that "zooming out" operates in a similar manner, except the order of display screens observed by the user during the "zooming out" operation are reversed. For instance, to "zoom out", the user marks the appropriate group object desired for viewing in lesser detail with a cursor and the information of the desired group object is reduced displaying a larger portion of the selected group object. In order to "zoom out", a user observing FIG. 5 would click the mouse while holding the keyboard shift key depressed to initiate a zoom out event. Upon the completion of the zoom operation, the user would observe the configuration of FIG. 4. As the user zooms out, the perceived separation of the zooming objects decreases and additional zooming objects may come into the available zooming space. For example, the portion of the triangle 312 outside the available view space 404 may enter the view space.

Space-Grid Grouping

To aid in an understanding of the space-grid grouping of the invention, consider the arrangement of objects as shown by FIG. 4. As seen in the figure, there is empty space between the star 410 and the triangle 412—empty space being defined as the space on a reference surface that is unoccupied by objects and the boundary of each object being defined by its bounding boxes. If the user wished to add an object that was logically related to the triangle 412, depending on the size of the object, it may or may not be possible to position the object in the empty space between the star 410 and the triangle 412.

If there is sufficient empty space in the zooming space to position a new object at a desired location near logically related objects, the object can be placed in the zooming space without affecting other objects. For example, a second circle may be placed in the empty space between the star and the triangle without affecting the displayed objects (i.e., without overlaying their bounding boxes). If, on the other hand, the object does not fit in the empty space without overlaying another object, under prior art methods the user would be forced to manually adjust the zooming space by shifting the previously positioned objects to create empty space into which new objects could be positioned.

Further, assume other objects were positioned behind the foreground objects on another surface and that these other objects were positioned according to some logical/hierarchical relation to the foreground object(s). A repositioning of a foreground object would also necessitate the repositioning of the background objects in order to maintain desired logical relations. With the prior art, a manual recreation of the desired spacing among objects on all reference surfaces will be necessary each time an object is added to the zooming space.

The zooming graphical user interface of the present invention provides a space-grid zooming object for organizing arbitrary two dimensional graphic elements as zooming objects for display in a table format. The table format of a space-grid is characterized by a plurality of cells. A space-grid is a graphical object comprised of the edges of each cell. The edges of a space-grid denote the boundaries of each cell of the space-grid and are displayed by the zooming graphical user interface to allow for the easy organization and association of logically related objects on the zooming space. Primitive objects may be positioned within a cell and such positioning automatically associates the positioned objects into a logically related group. The zooming graphical user interface of the invention also provides for automatic rearrangement of logically related objects which have been positioned in the cells of a space-grid group object.

Figure 6:
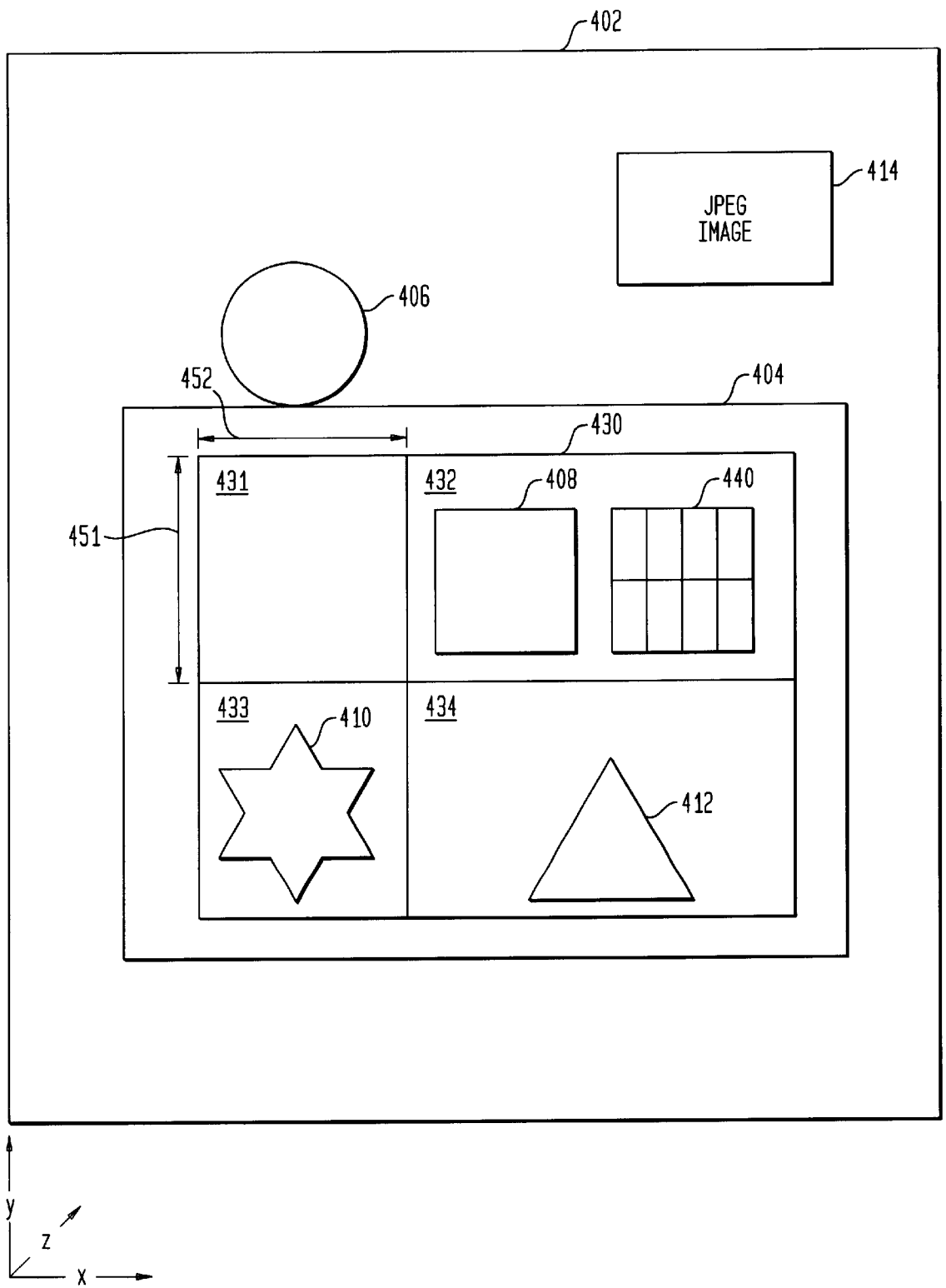
FIG. 6 is a schematic diagram illustrating various zooming display objects in a zooming space-grid in a zooming space in accordance with the interface of the present invention.

FIG. 6 illustrates logically related objects associated together using the space-grid group provided by the graphical user interface of this invention. Shown is a space-grid 430 located in a zooming space 402 and visible in an available view space 404. For the illustrated cases, the available view space 404 covers the space-grid 430 and the objects located in the space-grid, a square 408, a star 410, a triangle 412, and a second space-grid 440. A circle 406 and a JPEG image 414 are also located in the zooming space but are not in the available view space 404 and must be panned to for viewing.

A space-grid is formed by rows and columns of cells forming a two dimensional array. Each cell can be identified by a row and column coordinate pair, each cell having height and width dimensions. All cells in the same row have the same height dimension. All cells in the same column have the same width dimension. The initial dimensions of the cells of a space-grid can be set by conventional input means during the addition of a space-grid to the zooming space—e.g., user selection from a menu or tool bar displayed (or displayable) on the display screen of the user's terminal. Once a space-grid is placed in a zooming space, the dimensions of the space-grid are determined by the contents of each cell. Alternatively, the dimensions of cells can be set to fixed values. Various other methods for establishment of the initial cell dimensions will be apparent to those skilled in the art.

In FIG. 6, space-grid 430 is formed by four cells 431, 432, 433, 434, and forms a two-by-two array of rows and columns. Cells 431 and 432 form a first row, while cells 433 and 434 comprise a second row. A first column is formed by cells 431 and 433, while cells 432 and 434 form a second column. Each cell is identified by its row and column coordinate pair; for example, cell 431 may be identified as space-grid 430, row 1, column 1. Each cell has a height dimension 451 and a width dimension 452. In like manner, space-grid 440 is formed by a two row by four column array of eight cells. At a minimum, a space-grid can be formed by a single cell creating a one row by one column array.

Logically related objects may be positioned within a cell of a space-grid and so-positioned objects are automatically associated with the corresponding cell of the corresponding space-grid group. Any particular cell of a space-grid need not contain an object. For example, the star 410 is positioned in cell 433 of space-grid 430, while cell 434 of space-grid 430 is empty. Space-grids also may be nested by positioning a second spacegrid within another space-grid, as shown by the positioning of space-grid 440 within cell 432 of space-grid 430. For the illustrated case, all the cells of space-grid 440 are empty although any zooming object can be positioned in a space-grid cell.

The zooming graphical user interface of this invention permits display of selected objects at multiple levels of magnification. Objects may be magnified and reduced in size on display. As a objects are zoomed in and out, the scale of the zoomed level of detail increases and decreases causing objects to appear and disappear. Since the space-grid and other objects are implemented in a zooming environment, a user is easily able to zoom-in an inner space-grid to see and manipulate the contents of the zoomed space-grid and the objects contained therein.

Editing Additions to a Cell of a Space-Grid Group

Figure 7:
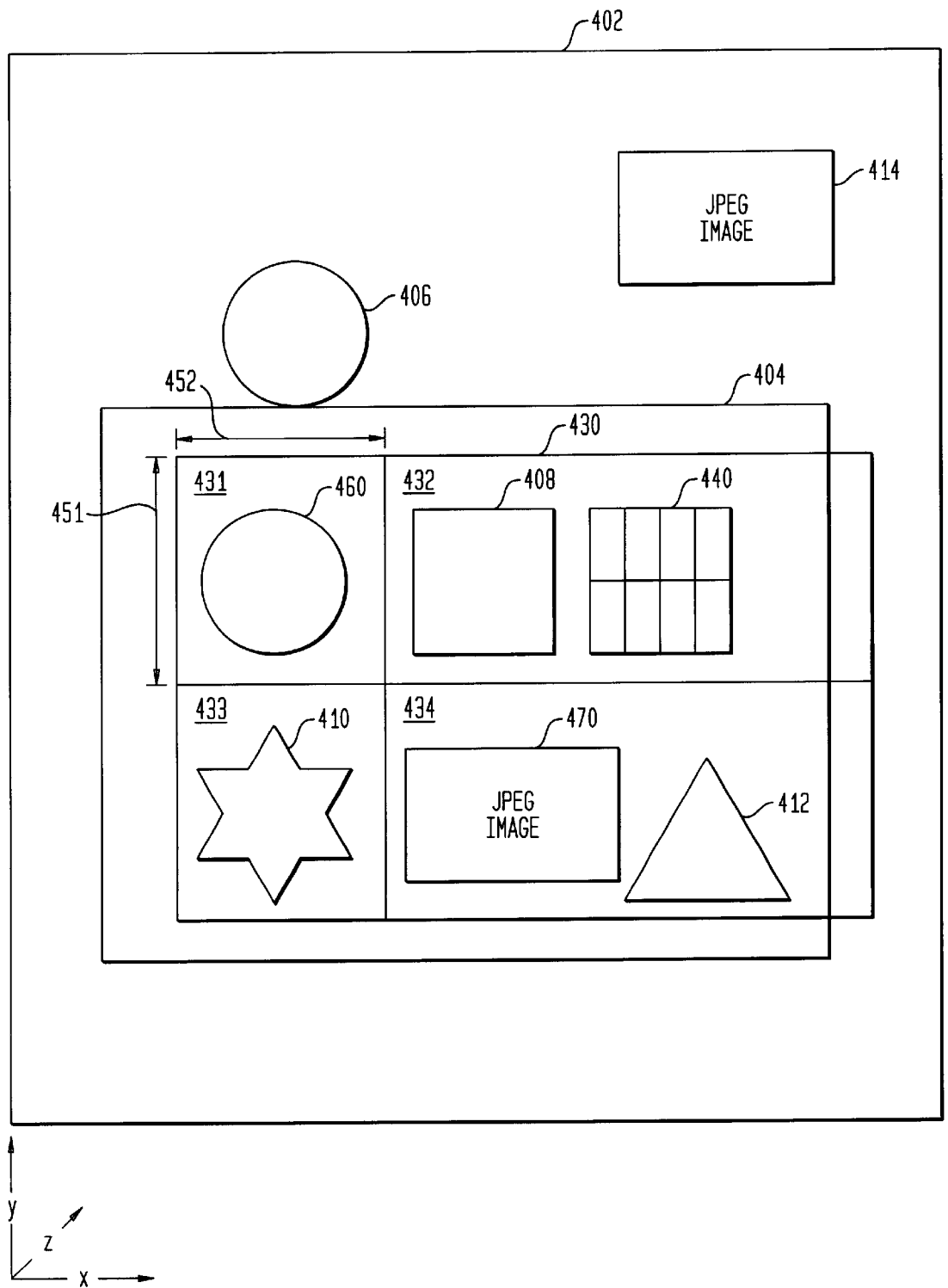
FIG. 7 is a schematic diagram illustrating the resulting display after the addition of objects to cells of a space-grid of FIG. 6.
Figure 8:
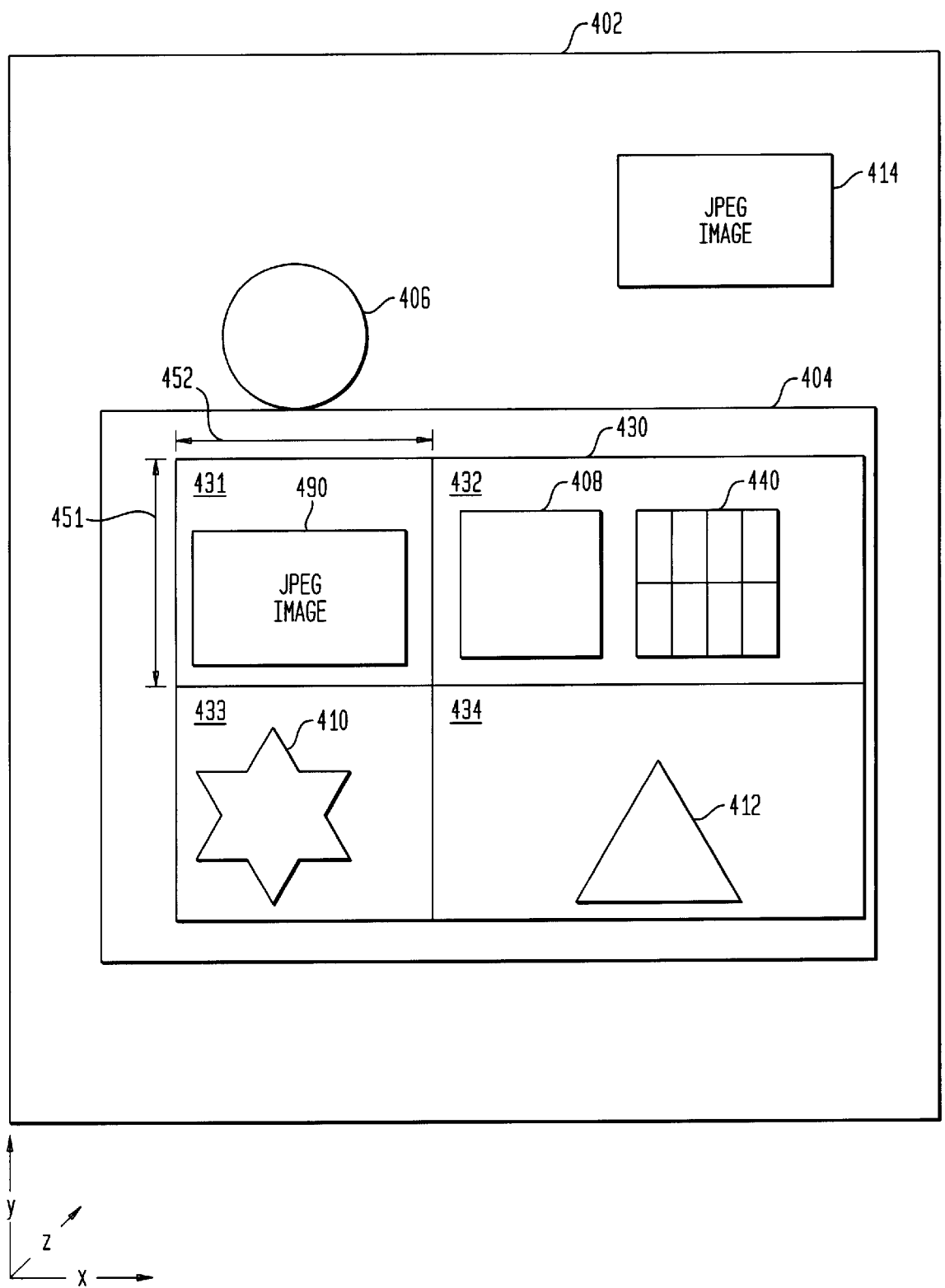
FIG. 8 is a schematic diagram illustrating the resulting display after the addition of object to a cell of a space-grid of FIG. 6.

The zooming graphical user interface of the present invention provides a space-grid group object that automatically maintains a desired spacing among logically related objects positioned in a zooming space when additional objects are added to the zooming space. FIGS. 7–8 illustrate the addition of objects to zooming space, more specifically a cell of a space-grid in a zooming space, relative to the objects shown in FIG. 6. In the discussion of those figures, the addition of a zooming object to a cell of the space-grid object according to the invention is described in terms of the adjustments made to the previously positioned objects in the zooming space, as shown by FIG. 6. Various methods for implementation of the selection and positioning of objects on the zooming space will be apparent to those skilled in the art. However, for a preferred embodiment of the invention, a user will select such functionality by way of a mouse input on a menu or tool bar and in a zooming space which is displayed (or displayable) on the display screen of the user's terminal. Alternatively a programmatic interface may be constructed for adding objects to a space grid.

FIG. 7 is a schematic diagram illustrating the addition of objects to cells of a spacegrid relative to the display shown in FIG. 6. As shown in FIG. 7, two objects have been added to space-grid 430. First, a circle 460 has been added to cell 431 of space-grid 430. Cell 431 of space-grid 430 was previously empty; it did not contain any zooming objects. As long as there is sufficient empty space in a space-grid cell to position a new zooming object so that the zooming object's bounding box does not overlay another object in the cell or the edges of the space-grid, the new object can be placed in the zooming space without affecting other objects, i.e. necessitating the resizing and repositioning of space-grid cells. In this case, there is no need for the zooming graphical user interface of the invention to either adjust the dimensions of another cell or cells with the same row or column coordinate as the edited cell or to reposition space-grid cells relative to the zooming space. As shown in FIG. 7, no adjustment of space-grid cell dimensions or cell locations was necessary to circumscribe the circle 460. The circle 460 was able to be positioned in empty space within the existing dimensions of cell 431 without overlaying any other objects or the edges of cell 431. Thus, the height dimension 451 and width dimension 452 of cell 431 in FIG. 7 remain the same as the height and width dimensions of cell 431 as shown in FIG. 6. Moreover, there is no need to adjust the height dimension of cell 432, the width dimension of cell 433, or the positioning of cells 432 and 434 relative to the zooming space.

Second, a JPEG image 470 has been added to cell 434 of space-grid 430. Cell 434 of space-grid 430 previously contained triangle 412. If there is not sufficient empty space in a space-grid cell in which to position a new object so that its bounding box does not overlay another object or the cell edges, the zooming graphical user interface of the present invention adjusts the dimensions of the cell, thereby creating empty space into which the zooming object to be added is positioned In this case, the zooming graphical user interface is required to adjust the dimensions of the current cell, as well as cells with the same row or column coordinate as edited cell. For example, the JPEG image 470 could not be positioned in cell 434, as that cell is dimensioned in FIG. 6, without overlaying part of the image (defined by its bounding box) of the previously positioned triangle 412 or the edges of cell 434. Therefore, the dimensions of the cell 434 must be adjusted so that the JPEG image 470 can be positioned in the user desired position within cell 434. FIG. 7 show the increase in the width of cell 434 necessary to enable the JPEG image 470 to be positioned inside cell 434.

As previously noted, changed dimensions also are translated throughout a space-grid. Since all cells in the same row have the same height dimension, altering the height of a cell adjusts the height dimension of all cells sharing the same row coordinate. Since all cells in the same column have the same width dimension, altering the width of a cell adjusts the width dimension of all cells sharing the same column dimension. In this case, since the width dimension of cell 434 was adjusted, the width dimension of cell 432, which shares column 2 of the space-grid, is adjusted as well. Since the height dimension of cell 434 did not need to be adjusted to enable the second JPEG image 470 to fit within cell 434, the height dimension of cell 433, which shares row 2 with cell 434, need not be adjusted.

FIG. 8 is a second schematic diagram illustrating the addition of an object to a space-grid cell relative to the display shown in FIG. 6. As shown in FIG. 8, a JPEG image 490 has been added to cell 431 of space-grid 430. Cell 431 of space-grid 430 was previously empty; it did not contain any zooming objects. However, there was not sufficient empty space in cell 431, as shown in FIG. 6, in which to position JPEG image 490 without overlaying the edges of cell 431. Therefore, the dimensions of the cell were automatically adjusted to create empty space into which JPEG image 490 is positioned, as shown in FIG. 8. With this increase in the width dimension of cell 431 to accept the JPEG, that width dimension is translated throughout the space-grid adjusting the width dimension of all cells with the same column coordinate. As shown, cell 433 has had its width dimension so adjusted. The height dimension of all cells in any particular row is similarly adjusted in response to the adjustment of the height of any cell in the row.

The position of an object in a zooming space is detailed according to X, Y, and Z coordinates, where X and Y corresponding to location on a planar surface and Z corresponds to a planar surface. When an object is positioned within a space-grid cell, X, Y, and Z coordinates are local coordinates that serve to position the object relative to an individual cell. To perform the discussed functionality, the zooming graphical user interface of the invention simply determines that a user input event has requested that an object be added to a cell of a space-grid. Based on the location of a user input event within a space-grid cell and the dimensions of the object sought to be added, the interface determines if the added object would overlay previously positioned objects or the edges of the space-grid cell. If the additional object will not overlay objects in a cell or the cell edges, the additional object is associated with the chosen cell of the space-grid and assigned coordinates corresponding to the chosen location within the cell on the zooming space.

If the additional object will overlay previously positioned objects or the edges of a selected space-grid cell, the interface creates empty space in the space-grid cell for the additional object to occupy. The dimensions of the cell are adjusted so that the additional object can be positioned in the space-grid cell without overlaying the edges of the space-grid cell. The height dimension of all cells with the same row coordinate and the width dimension of all cells with the same column coordinate are set equal to the corresponding dimensions of the edited cell, thereby altering the location of cells relative to the zooming space. Objects located within the edited space-grid cell that have local coordinates with either an X coordinate or a Y coordinate greater than or equal to the coordinates of the user input event are shifted from the user input event location in the +X direction and +Y direction so that the additional object can be located at the selected location in the cell without overlaying any objects. This would require a shift in the +X and +Y directions equal to the difference between the dimensions of the additional object, as defined by its bounding box, and the available empty space in the space-grid cell. The local coordinates of all other zooming objects are preserved. In a preferred embodiment, all objects are placed on a single reference surface in order to minimize the calculations necessary to perform the automatic shifting of cells. Error handling ensures that the increased dimensions of the space-grid do not cause an overlay of the dimensionally increased space-grid and objects positioned outside a space-grid. An intersection test of the corner coordinates of the bounding box for objects positioned outside a space-grid determines whether the adjusted space-grid is located under a corner of an object. If the adjusted space-grid is located under a corner of an object, the user is prompted with an error message that the attempted modification is not permitted.

In a zooming environment, objects may be located on multiple reference surfaces. In that case, once an object is positioned, the zooming graphical user interface of the present invention performs the above explained adjustment for each reference surface. This functionality requires the translation of the zooming coordinates of objects located on all references surfaces (X,Y,Z) within a space-grid cell into a global coordinates system for the zooming space (X,Y) prior to the adjustment of coordinates to create empty space for the positioning of a new object. After adjustment of the global coordinates, they are retranslated into the (X,Y,Z) reference surface coordinate system.

Conclusion:

There has been described and illustrated herein, a computer interface for organizing, arranging and zooming logical sets of zooming objects in a zooming graphical user interface. The interface allows information displayed as a zooming universe of graphical objects to be manipulated with interactive input devices. Logically related objects are positioned in a cell of a space-grid group object with a desired spatial relationship relative to other zooming objects in the cell. Dimensions of a cell of a space-grid group are automatically increased by the zooming graphical user interface of the invention so as to permit an object newly positioned in a space-grid cell to be circumscribed by the cell without overlaying other objects in the cell. Also, the dimensions of cells with row or column coordinates corresponding to an edited cell are automatically adjusted to the edited cell's corresponding dimension. The positioning of cells of the space-grid is adjusted relative to the zooming space to allow for changed cell dimensions, while the spatial relationships of objects within individual cells are preserved. The zooming graphical user interface of the invention permits a user to easily organize and re/arrange logical sets of zooming objects in a zooming graphical interface.

It is to be understood that the invention is not limited to the illustrated and described forms of the invention contained herein. It will be apparent to those skilled in the art that various changes may be made without departing from the scope of the invention and the invention is not considered limited to what is shown in the drawings and described in the specification.

What is claimed is:

1. A method of arranging representation objects displayed on a reference surface in a display area, the method comprising the steps of:

storing a data object for each said representation object wherein each data object comprises at least one instance variable for associating said representation object with other representation objects in response to a control signal, and said stored instance variable is associated with a space-grid cell instance for grouping said representation object with other representation objects; and providing said control signal.

2. The method of arranging representation objects of claim 1 wherein said step of storing a data object further comprises the step of:

storing at least one instance variable for determining an address of said representation object on the reference surface.

3. The method of arranging representation objects of claim 1 wherein said step of storing a data object further comprises the step of:

storing at least one instance variable for determining the positioning of said space-grid relative to a zooming space.

4. The method of arranging representation objects of claim 1 wherein said data object for a space-grid cell is characterized by at least one space-grid cell dimension instance variable.

5. The method of arranging representation objects of claim 1 further comprising the step of:

displaying all said associated representation objects, in response to said control signal, within a space-grid cell having at least one dimension and forming a table having at least one row and at least one column.

6. The method of arranging representation objects of claim 1 further comprising the step of:

determining whether a first representation object can be positioned within a space-grid cell without overlaying a second representation object associated with space-grid cell or the space-grid edges, in response to control signals associating a representation object to a space-grid cell.

7. The method of arranging representation objects of claim 1 further comprising the step of:

increasing one of said space-grid cell dimensions in order that a first representation object can be positioned within a space-grid cell without overlaying a second representation object or the space-grid edges, in response to control signals associating a representation object to a space-grid cell.

8. The method of arranging representation object of claim 7 further comprising the step of:

positioning said first representation object without overlaying said space-grid edges and said second representation object.

9. The method of arranging representation objects of claim 7 further comprising the step of:

altering the height dimension of a cell with a first row coordinate in response to the editing of any cell with said first row coordinate;

altering the width dimension of a cell with a first column coordinate in response to the editing of any cell with said first column coordinate.

10. The method of arranging representation objects of claim 7 further comprising the step of:

adjusting the positioning of objects relative to the edited cell in response to the positioning of a new object in the edited cell.

11. The method of arranging representation objects of claim 7 wherein said step of adjusting further comprises the steps of:

determining position of input event in local space-grid cell coordinates;

moving all objects associated with space-grid cell having a X coordinate greater than or equal to input event X coordinate in the positive X direction the number of units equal to the X dimension of the added object; and moving all objects associated with space-grid cell having a Y coordinate greater than or equal to input event Y coordinate in the positive Y direction the number of units equal to the Y dimension of the added object.

12. The method of arranging representation objects of claim 7 further comprising the step of:

displaying said representation objects on a display.

* * * * *

UNITED STATES PATENT AND TRADEMARK OFFICE
CERTIFICATE OF CORRECTION

PATENT NO. : 6,377,285 B1
DATED : April 23, 2002
INVENTOR(S) : Nghi Dong Doan and Kenneth Herndon It is certified that error appears in the above-identified patent and that said Letters Patent is hereby corrected as shown below:

<u>Title page,</u>
Item [73], Assignees, "Sony Electronics," should read -- Sony Electronics Inc., --.
Item [57], ABSTRACT,
Line 16, "Cell with the same" should read -- Cells with the same --.
Line 18, "one cell are translated" should read -- one cell is translated --.

<u>Column 1,</u>
Line 38, "to a graphical" should read -- to graphical --.

<u>Column 2,</u>
Line 24, "well structured" should read -- well-structured --.
Line 40, "space are logically" should read -- space is logically --.

<u>Column 4,</u>
Line 46, "object" shuld read -- objects --.

<u>Column 6,</u>
Line 34, "over a ethernet" should read -- over an ethernet --.

<u>Column 8,</u>
Line 9, "Interface" should read -- Interfaces --.

<u>Column 9,</u>
Line 66, "is located" should read -- are located --.

<u>Column 10,</u>
Line 4, "space an be" should read -- space can be --.

<u>Column 11,</u>
Line 27, "are reversed" should read -- is reversed --.

<u>Column 13,</u>
Lines 3 and 39, "spacegrid" should read -- space grid --.
Line 11, "As a objects" should read -- As objects --.

<u>Column 14,</u>
Line 7, "positioned In" should read -- positioned. In --
Line 17, "show" should read -- shows --.

UNITED STATES PATENT AND TRADEMARK OFFICE
CERTIFICATE OF CORRECTION

PATENT NO. : 6,377,285 B1
DATED : April 23, 2002
INVENTOR(S) : Nghi Dong Doan and Kenneth Herndon It is certified that error appears in the above-identified patent and that said Letters Patent is hereby corrected as shown below:

Column 16,
Line 61, "object" should read -- objects --.

Column 18,
Line 4, "a X" should read -- an X --.

Signed and Sealed this

Eighteenth Day of February, 2003

JAMES E. ROGAN
*Director of the United States Patent and Trademark Office*